US012392473B2

(12) United States Patent
Van Delden et al.

(10) Patent No.: US 12,392,473 B2
(45) Date of Patent: Aug. 19, 2025

(54) LIGHTING DEVICE HAVING A NON-UNIFORM VOLUMETRIC DIFFUSER WITH OPEN AND/OR CLOSED CELLS

(71) Applicant: SIGNIFY HOLDING B.V., Eindhoven (NL)

(72) Inventors: Martinus Hermanus Wilhelmus Maria Van Delden, Venlo (NL); Simon Jacobus Maria Kuppens, Geldrop (NL); Peter Johannes Martinus Bukkems, Deurne (NL); Barry Mos, Bocholt (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/838,103

(22) PCT Filed: Feb. 16, 2023

(86) PCT No.: PCT/EP2023/053935
§ 371 (c)(1),
(2) Date: Aug. 13, 2024

(87) PCT Pub. No.: WO2023/161129
PCT Pub. Date: Aug. 31, 2023

(65) Prior Publication Data

US 2025/0146645 A1 May 8, 2025

(30) Foreign Application Priority Data

Feb. 28, 2022 (EP) .................................... 22159115

(51) Int. Cl.
*F21V 3/04* (2018.01)

(52) U.S. Cl.
CPC .................................... *F21V 3/049* (2013.01)

(58) Field of Classification Search
CPC ....... F21V 3/049; F21V 3/063; G02B 5/0247; G02B 5/0242
See application file for complete search history.

(56) References Cited

U.S. PATENT DOCUMENTS

| | | | |
|---|---|---|---|
| 7,722,224 B1 | 5/2010 | Coleman et al. | |
| 11,175,018 B2 | 11/2021 | Van Delden | |
| 2008/0205035 A1 | 8/2008 | Asvadi et al. | |
| 2010/0031544 A1 | 2/2010 | Hwang | |
| 2011/0058379 A1 | 3/2011 | Diamantidis | |
| 2014/0055849 A1* | 2/2014 | Son ...................... | G02B 5/0268 359/361 |
| 2021/0025567 A1 | 1/2021 | Van Delden | |

FOREIGN PATENT DOCUMENTS

| | | |
|---|---|---|
| JP | 2006202725 A | 8/2006 |
| WO | 2008054085 A1 | 5/2008 |
| WO | 2012047924 A1 | 4/2012 |
| WO | 2019192950 A1 | 10/2019 |

* cited by examiner

*Primary Examiner* — Robert J May

(57) ABSTRACT

The present invention relates to a lighting device (10), comprising: at least one light source (12) adapted to emit light (28*a,* 28b); a uniform diffuser (20) forming a light exit window of the lighting device; and a non-uniform volumetric diffuser (16) arranged between the at least one light source and the uniform diffuser.

15 Claims, 9 Drawing Sheets

LIGHTING DEVICE HAVING A NON-UNIFORM VOLUMETRIC DIFFUSER WITH OPEN AND/OR CLOSED CELLS

CROSS-REFERENCE TO PRIOR APPLICATIONS

This application is the U.S. National Phase application under 35 U.S.C. § 371 of International Application No. PCT/EP2023/053935, filed on Feb. 16, 2023, which claims the benefit of European Patent Application No. 22159115.9, filed on Feb. 28, 2022. These applications are hereby incorporated by reference herein.

FIELD OF THE INVENTION

The present invention relates to a lighting device, for example for office lighting.

BACKGROUND OF THE INVENTION

The traditional surface appearance of the light exit window of office lighting devices is designed to be smooth and uniform.

US2010031544A1 discloses a cover plate for a lighting fixture, "which achieves superior light diffusivity and light uniformity as well as superior light transmission". The cover plate is arranged at an exterior of a light source of the light fixture so as to exit lighting emitted from the light source outward. The cover plate is made of light transmissive resin material having 5-35% of bubbles for light scattering, which has a diameter within a range of 60 μm~700 μm, and exits light emitted from the light source while diffusing the light to the whole area of the cover plate.

SUMMARY OF THE INVENTION

Since the surface appearance of the light exit window of office lighting devices traditionally is designed to be smooth and uniform, conventional lighting devices may be hard to integrate with human centric and biophilic lighting concepts, benefiting from the presence of familiar feeling patterns and textures of nature.

It is an object of the present invention to overcome this problem, and to provide an improved lighting device.

According to a first aspect of the invention, this and other objects are achieved by a lighting device, comprising: at least one light source adapted to emit light; a uniform diffuser forming a light exit window of the lighting device; and a non-uniform volumetric diffuser arranged between the at least one light source and the uniform diffuser, (such that the light exit window is non-uniformly lit when the lighting device is on). The non-uniform volumetric diffuser may have a first surface facing the at least one light source and a second, opposite surface facing the light exit window.

The present invention is based on the understanding that by providing a non-uniform volumetric diffuser between the light source(s) and a uniform diffuser, texture and depth beyond the light exit window may be provided when the lighting device is on, which in turn may allow the lighting device to better integrate with human centric and biophilic lighting concepts and natural lighting systems, such as NatureConnect by Signify. The texture could for example be a natural pattern, such as a marble like pattern. On the other hand, the uniform diffuser can make sure that the non-uniform volumetric diffuser/texture is concealed when the lighting device is off.

The non-uniform diffuser may be 'volumetric' in that (most if not all of) the optical gap between the at least one light source and the light exit window is filled with diffuser material (=the non-uniform diffuser).

The non-uniform volumetric diffuser may have open and/or closed cells (bubbles), preferably open and closed cells. The non-uniform volumetric diffuser may for example be a foam, preferably a rigid foam. Furthermore, the volumetric diffuser may be non-uniform in three dimensions (i.e. in X, Y, and Z direction). Specifically, the non-uniform volumetric diffuser may have non-uniform cell size, which yields the texture beyond the light exit window.

The non-uniform volumetric diffuser may be configured such that some of the emitted light is diffused (scattered) by the non-uniform volumetric diffuser before striking the light exit window, giving rise to texture beyond the light exit window, whereas at least one other portion of the emitted light passes through the non-uniform volumetric diffuser without being (substantially) diffused. In other words, the at least one other portion of the emitted light directly or almost directly hits the light exit window. The at least one other portion of the emitted light passing through the non-uniform volumetric diffuser without being substantially diffused can yield local sparkle and highlights when the lighting device is on. The local sparkle and/or highlights in combination with the uniform diffuser makes the present lighting device blend in perfectly with painted and acoustic ceiling tiles, for example.

(At least) some of the open and/or closed cells may have cell diameters up to at least 0.6 cm or up to at least 1.0 cm. When the non-uniform volumetric diffuser is thin, say 2.5-3 cm, such large cells/bubbles diffuse far less light than cells/bubbles of say 0.1-0.3 cm. A 2.5-3 cm thick non-uniform volumetric diffuser, having a thickness, being the distance between the first surface and the second, opposite surface, may have between 3-5 cells/bubbles from said first surface to said second, opposite surface facing, as seen in a perpendicular direction relative to said surfaces. So, the lighting device may have the feature that the non-uniform volumetric diffuser may have relatively large cells/bubbles with a relatively large diameter, wherein the largest diameter of said cell/bubble may be in the range of 25-40% of the thickness of the non-uniform volumetric diffuser, optionally without the non-uniform volumetric diffuser comprising relatively small cells/bubbles having, for example, a diameter in the range smaller than 5% of the thickness, such as diameters in a range of 0.05-3% or 0.1-2% of said thickness. Furthermore, a number (say 3-5) of large cells (e.g. in the range of 0.6 to 1.0 cm) can be aligned from the first to the second surface, whereby light can pass essentially without being diffused, i.e. diffusion is less than, for example, 10%. In addition to the large cells/bubbles, other open and/or closed cells of the non-uniform volumetric diffuser could be as small as 0.01 cm. Hence, the open and/or closed cells of the non-uniform volumetric diffuser may range between 0.01-1.0 cm, more preferably 0.01-0.6 cm.

The non-uniform volumetric diffuser can have 80-95% of cells, more preferably 90-95%. That is, the air fraction of the volume of the non-uniform volumetric diffuser may be 80-95% (or 90-95%), while the material of the circumference/wall of the cells may be 5-20% (or 5-10%) of the volume of the non-uniform volumetric diffuser, so that the non-uniform volumetric diffuser is substantially cells/bubbles and very light weight.

The non-uniform volumetric diffuser may for example have a thickness in the range of 2 to 4 cm, preferably in the range of 2.5 to 3 cm, such as 2.5 cm or 3 cm. However, for a smaller LED pitch the non-uniform volumetric diffuser can be thinner (and the cells/bubbles smaller). The thickness may be uniform across the non-uniform volumetric diffuser. Another option is to have pockets, dents, and/or embossed pattern(s) on the first backside surface of the volumetric diffuser, giving rise to different textures and light intensities at the second front surface of the volumetric diffuser. So, when looking at the lighting device these different patterns can be observed, but they cannot be observed in the field of light emitted into the space the lighting device lights up, for example an office space. That light is uniformly distributed.

The non-uniform volumetric diffuser may have a gradient in scattering properties through the volume of the non-uniform volumetric diffuser. For example, the average cell size of the open and/or closed cells of the non-uniform volumetric diffuser may increase from said first surface to said second surface (smaller cells/bubbles scatter more than larger cells/bubbles). It this way, smaller cells at the first surface can help blurring larger cells at the second surface facing the light exit window. In more detail, a bubble or cell only has material at its circumference; it is (like) a hollow transparent ball. When light passes through the cell wall, some light is absorbed, some scattered in a different direction. So, a “shadow” of the cell may be projected at the backside of the uniform diffuser. This happens for every cell, bubble. As shadows overlap in part, texture is generated. When many, many shadows of small sized cells/bubbles overlap the information of individual bubbles, cells are “lost”, resulting in blur. The aforementioned gradient may depend on the foaming direction and pouring technology.

The non-uniform volumetric diffuser may comprise at least two substantially mirror-symmetric portions on said first surface and/or said second surface formed by cleaving (or cleavage). I.e., the first surfaces of both the portions, the second surfaces of both the portions, or the first surface of one portion and the second surface of the other portion may substantially or seemingly be or look the same. This may be achieved by cutting a (precursory) non-uniform volumetric diffuser in half, and opening it up like a “book”. This could be performed more than one time, to create symmetry in multiple directions. A non-uniform volumetric diffuser comprising e.g. two mirror-symmetric portions can be aesthetically pleasing. It may also improve the perception of the non-uniformity of the volumetric diffuser.

The uniform diffuser should be selected such that a texture of the non-uniform volumetric diffuser is visible beyond the uniform diffuser when the lighting device is on but not visible through the uniform diffuser when the lighting device is off. To achieve the former, the uniform diffuser may be sufficiently transparent/highly light transmissive (e.g. 92%) and/or thin (e.g. thickness in the range of 200-475 μm). On the other hand, the light transmission should be just low enough to fully obscure the foam/non-uniform volumetric diffuser in the off-state of the lighting device.

The uniform diffuser may for example be a uniform plate or sheet diffuser, in particular an amorphous (sheet) diffuser having an amorphous surface layer, coat, or film. Such a uniform diffuser performs very well in the off-state, namely the appearance when off and struck by ambient (day) light is very uniform and free of texture, which makes it easy to blend in with acoustic surface tiles, for example.

It can be noted that the non-uniform volumetric diffuser also may scatter ambient internal light on its way to the backside of the volumetric diffuser, where it is reflected, and again diffused on its way out. So the volumetric and amorphous diffusers can work together to achieve the off state appearance.

The uniform diffuser and the non-uniform volumetric diffuser may form a (double) diffuser stack arranged to be backlit by the at least one light source. The non-uniform volumetric diffuser may be arranged upstream of the uniform diffuser, and the uniform diffuser may be arranged downstream of the non-uniform volumetric diffuser.

The diffuser stack will typically be flat. Alternatively, the diffuser stack could be curved over multiple dimensions, either uniform or non-uniform. The diffuser stack could for example be curved into a cylinder shape, to build a marbled pendulum lamp which has uniform appearance in the off-state, but in the on-state changes perspective and shows sparkle dynamically as the viewing angle is changed (by a person moving around the lamp).

The at least one light source may comprise a plurality of discrete light sources arranged on a (light source) carrier. The discrete light sources may beneficially contribute to the sparkle effect. The discrete light sources may for example be LEDs (light emitting diodes). The discrete light sources may be arranged in an array. The discrete light sources/LEDs may be white. At least some of the discrete light sources/LEDs could be of different colors, to enhance the texture/marble effect further. Furthermore, the lighting device may be configured so that only part of the light exit window is lit. This could be achieved by only turning on some of the light sources, or by not distributing the light sources across the whole lighting device. Instead of discrete light sources, a uniform light source such as a conventional LED tile could be used. This would still realize texture beyond the light exit window, but without the sparkle effect. The light source carrier could for example be a printed circuit board (PCB). The light source carrier could have or be coupled to side walls, to form an optical mixing box. The light source carrier could be reflective, and optionally comprise a decorative pattern, absorbing some of the diffused light to create light intensity gradient at the light exit window.

The lighting device can further comprise a holed reflector sheet overlayed to the carrier and serving as a mechanical spacer between the discrete light sources and the non-uniform volumetric diffuser such that there is no mechanical contact between the discrete light sources and the non-uniform volumetric diffuser. The holed reflector sheet may comprise a plurality of holes matching the plurality of discrete light sources. When in contact, the refractive index between the light source/LED and the material in touch changes, thus the recycling of the photons in the LED package changes, resulting in a different color of the LEDs—this is avoided due to the present holed reflector sheet. Furthermore, the holed reflector sheet may provide a higher reflectivity than the carrier alone, and thereby improve the light output of the lighting device. The holed reflector sheet may in addition comprise a pattern.

The present lighting device may for example be applied in a ceiling, specifically as a lighting tile in an office ceiling mixed with acoustic tiles. Several lighting devices/lighting tiles could be provided in such a ceiling. The lighting device could alternatively be wall-mounted/vertically arranged, for example.

Furthermore, the lighting device could be integrated in an acoustic tile. In other words, according to a second aspect of the invention, there is provided an acoustic tile comprising a lighting device according to the first aspect. The lighting device could for example be arranged in a cut hole in the acoustic tile. The hole could have any shape or size, such as square, rectangular, irregular, etc. Optionally, the whole acoustic tile is covered with the uniform diffuser, but with the portion covering the acoustic tile portion where the lighting device is not present coming with micro-perforations. Hence, in the off-state, the lighting device acts as an acoustic tile portion, and the ceiling appears fully uniform, whereas in the on-state, one or more portions of the acoustic tile light up, with the lit portion(s) showing sparkle, texture, and depth beyond the ceiling, providing the impression that there is a space behind the ceiling.

The lighting device could be also be integrated in other devices or objects, such as a (free hanging) 3-D body, with one or more sides, or portions of a side being lit (independently).

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions may be exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
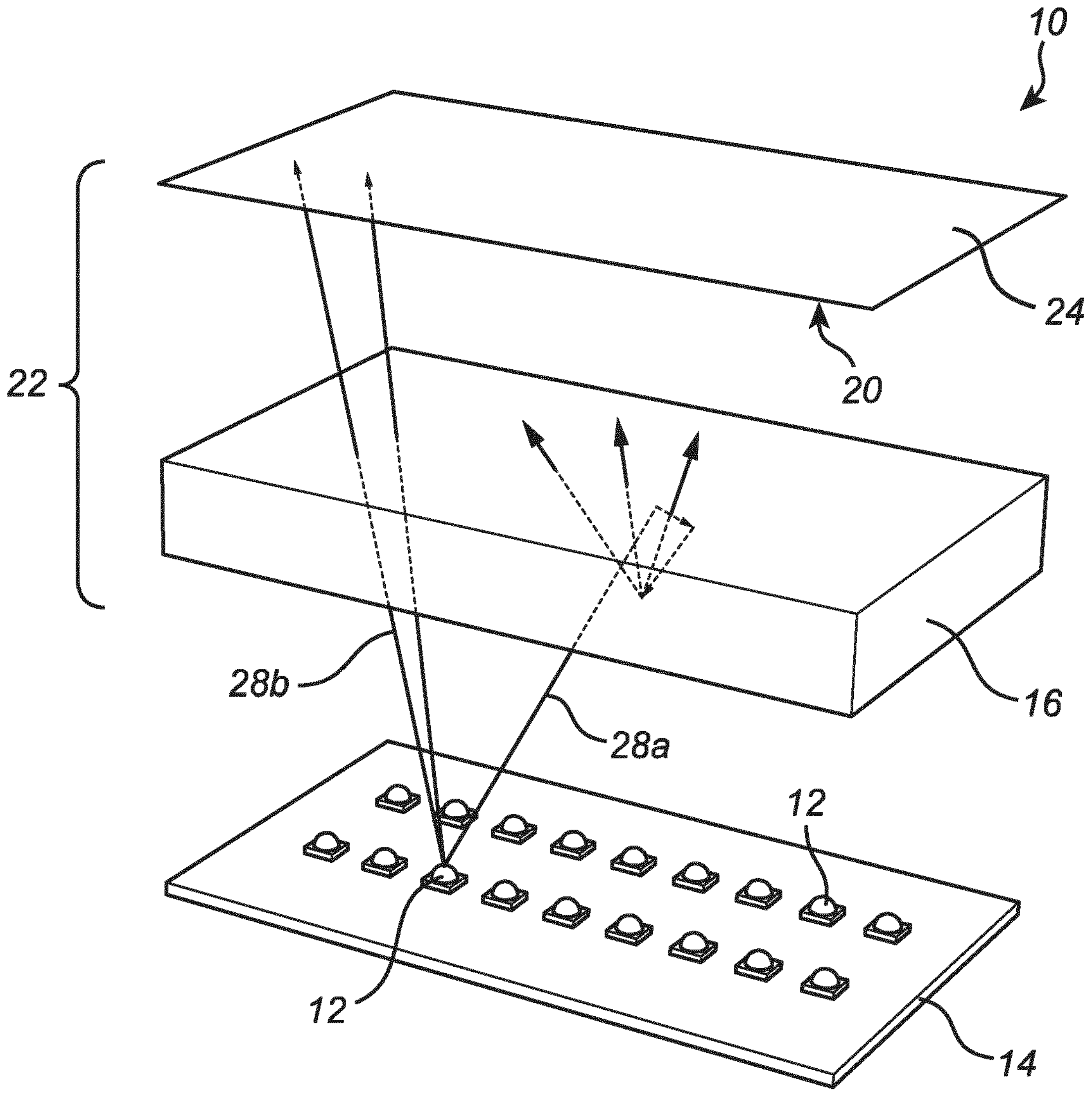
FIG. 1 is a schematic exploded perspective view of lighting device according to an embodiment of the present invention.

FIG. 1 illustrates a lighting device 10 according to an embodiment of the present invention.

The lighting device 10 comprises at least one light source adapted to emit light, here a plurality of discrete light sources 12. The light sources 12 may for example be white LEDs. The light sources 12 are arranged or disposed on a (light source) carrier 14, for example a PCB. The carrier 14 may for example be square or rectangular. The carrier 14 could have or be coupled to side walls (not shown), to build an optical mixing box. The light sources 12 may be arranged in an array, with a plurality of rows and columns, as in FIG. 1.

The lighting device 10 further comprises a first diffuser, namely a non-uniform volumetric diffuser 16. The non-uniform volumetric diffuser 16 could also be referred to as a non-uniform bulk diffuser or a non-homogenous bulk/volumetric diffuser. The non-uniform volumetric diffuser 16 is arranged over the carrier 14, covering the light sources 12. The non-uniform volumetric diffuser 16 may for example have a square or rectangular base area, and a thickness t in the range of 2.5-3 cm (for example).

Figure 2:
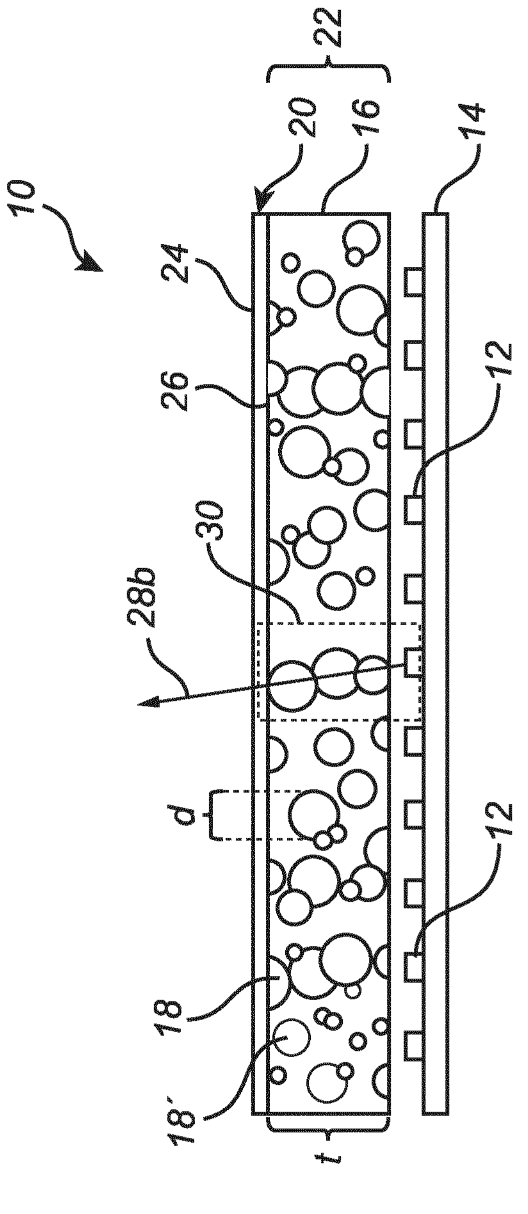
FIG. 2 is a schematic side view of the lighting device of FIG. 1.
Figure 3:
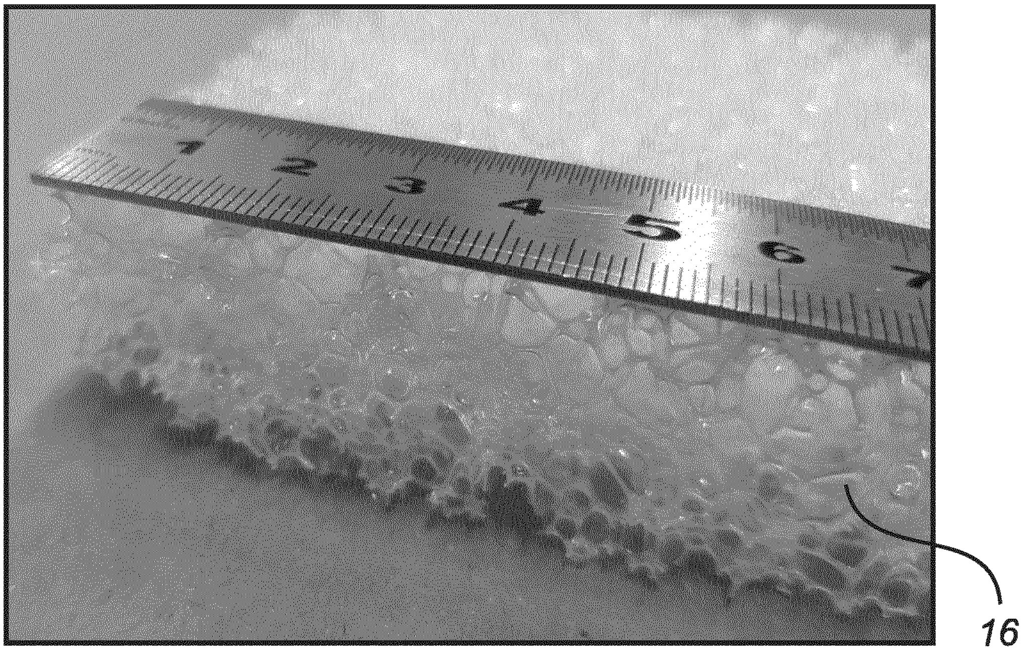
FIG. 3 is a photo of a foam that could be used as non-uniform volumetric diffuser in the present lighting device.

With further reference to FIG. 2, the non-uniform volumetric diffuser 16 may have a wide distribution of open and closed cells (bubbles) 18, 18', with cell diameters d ranging between 0.01-1.0 cm, more preferably 0.01-0.6 cm. That is, the non-uniform volumetric diffuser 16 features non-uniform cell size. The non-uniform volumetric diffuser 16 may for example be a foam, preferably a rigid foam, as shown in FIG. 3. The non-uniform volumetric diffuser 16 can have 80-90% of cells 18, 18'.

The lighting device 10 further comprises a second diffuser, namely a uniform diffuser 20. The uniform diffuser 20 could also be referred to as a homogeneous diffuser or a uniform/homogeneous light exit window diffuser. The uniform diffuser 20 covers the non-uniform volumetric diffuser 16. The non-uniform volumetric diffuser 16 is hence arranged between the light sources 12 and the uniform diffuser 20. The first non-uniform volumetric diffuser 16 and the second uniform diffuser 20 preferably form a double diffuser stack 22, and the uniform diffuser 20 may for example be square or rectangular, to match the non-uniform volumetric diffuser 16. As shown in FIGS. 1-2, the double diffuser stack 22 is arranged to be backlit by the light sources 12, and the downstream uniform diffuser 20 also forms the light exit window of the lighting device 10. The uniform diffuser 20 is preferably a thin and uniform plate or sheet diffuser. The uniform diffuser 20 may in particular have an amorphous surface layer, coat or film 24 at the observer side. The uniform diffuser 20 may be highly light transmissive (e.g. $88\%<T<92\%$) and have thickness in the range of 200-475 μm, for example.

The non-uniform volumetric diffuser 16 may be arranged between the light source 12 and the uniform diffuser 20, such that the uniform diffuser/light exit window 20 is non-uniformly lit when the light sources 12 of the lighting device 10 are on (on-state). In particular, the non-uniform volumetric diffuser 16 including its texture may be imaged at the backside 26 of the uniform diffuser/light exit window 20 when the lighting device 10 is on.

Figure 4:
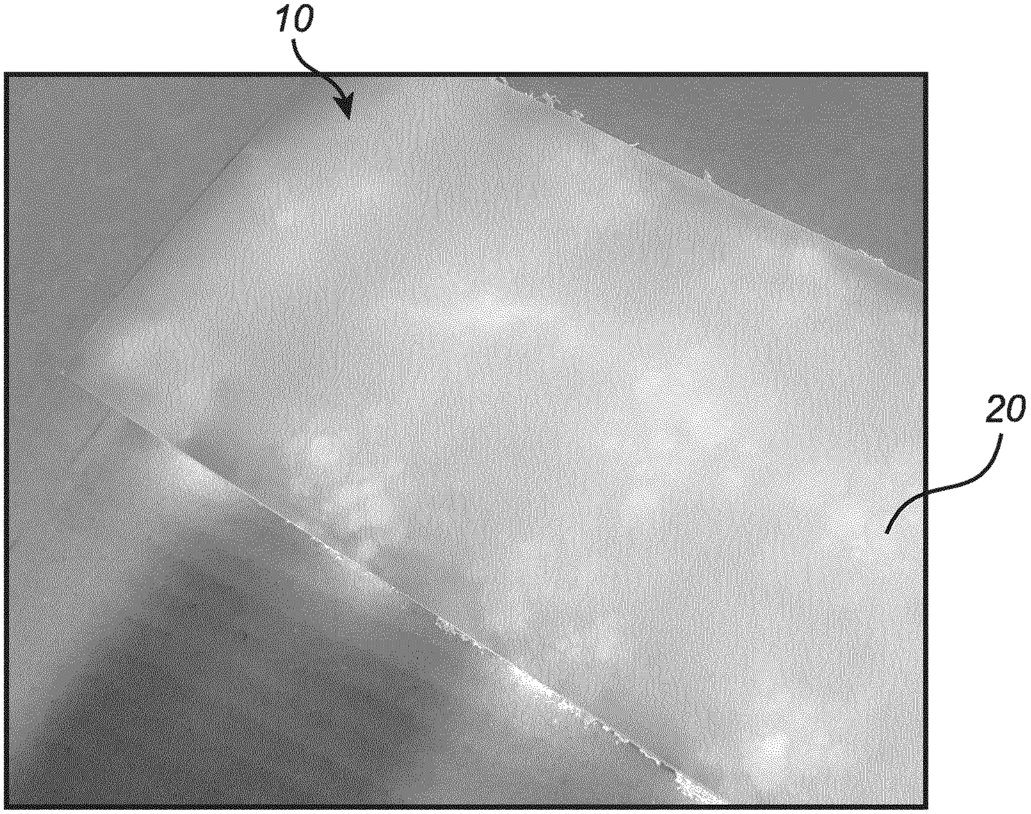
FIG. 4 is a photo of the present lighting device turned on and as seen from the exit window side.

Furthermore, the non-uniform volumetric diffuser 16 may be configured such that some 28*a* of the emitted light is diffused by the non-uniform volumetric diffuser 16 before striking the light exit window 20, whereas at least one other portion 28*b* of the emitted light passes through the non-uniform volumetric diffuser 16 without being substantially diffused. In other words, some light rays 28*a* become scattered, other 28*b* pass nearly undisturbed to the backside 26 of the light exit window 20. The former gives rise to texture beyond the light exit window 20, which texture is visible beyond/behind the uniform diffuser/light exit window 20 when the lighting device 10 is on (see FIG. 4), thanks to the thin and sufficiently transparent diffuser 20. And the latter may be achieved in that the non-uniform volumetric diffuser 16 at places have a number (say 3-5) of large (e.g. in the range of 0.6 to 1.0 cm) and preferably open cells 18 aligned over the thickness t, as shown at 30 in FIG.

2. The light 28*b* can yield local sparkle and highlights when the lighting device 10 is on. At 30, three cells 18, 18' having a diameter in the range of 25-40% of said thickness t, span the thickness t of the non-uniform volumetric diffuser 16.

When the light sources 12 of the lighting device 10 are off (off-state) and the light exit window 20 is struck by ambient light, the uniform diffuser 20 may help ensure that the texture of the non-uniform volumetric diffuser 16 is not visible through the uniform diffuser 20. In other words, the uniform diffuser 20 fully obscures the foam's texture when in the off-state, at least partly thanks to the limited light transmission of the uniform diffuser 20. As indicated above, a sheet diffuser having an amorphous surface film could be used to achieve this. Optionally, a small air gap (not shown) may be present between the first and second diffusers 16, 20 to enhance the diffusing action.

It should be noted that the non-uniform volumetric diffuser 16 also may scatter ambient incident light on its way to the backside 32*a* of the volumetric diffuser, where it is (diffuse) reflected (for example by holed reflector sheet 36; see FIGS. 7*a-b*), and again diffused on its way out. Hence, there is at least quadruple diffusion (twice (in and out) by the non-uniform volumetric diffuser 16 and twice (in and out) by the uniform diffuser 20), and at least once by the diffused and holed reflector sheet 36, which together serves to make the light exit window appear uniform in the off-state.

Figure 5:
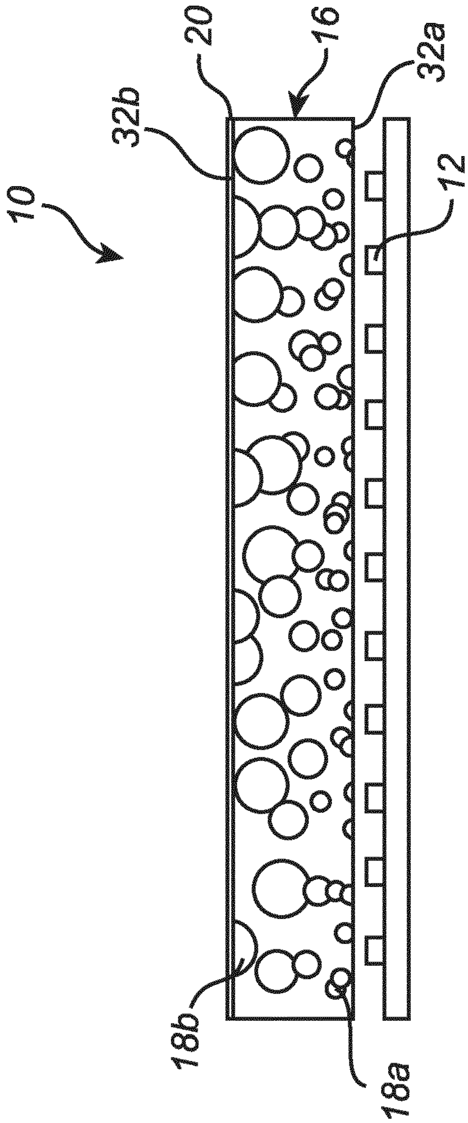
FIG. 5 is a schematic side view of a lighting device according to an embodiment with a gradient in scattering.

FIG. 5 illustrates an embodiment of the lighting device 10 similar to FIGS. 1-2, but wherein the non-uniform volumetric diffuser 16 has gradient in scattering properties through the volume of the non-uniform volumetric diffuser 16. Specifically, the average cell size of the open and/or closed cells 18*a-b* increases from a first surface 32*a* to a second surface 32*b* of the non-uniform volumetric diffuser 16, wherein the first surface 32*a* faces the light sources 12 and the second, opposite surface 32*b* faces the uniform diffuser/light exit window 20. Here, the smaller cells/bubbles 18*a* scatter the light from the light sources 12 more than the larger cells/bubbles 18*b*. The smaller cells/bubbles 18*a* could be as small as 0.01 cm, and larger cells/bubbles 18*b* could be as large as 0.6-1.0 cm in diameter.

It should be noted that since the non-uniform volumetric diffuser 16 may have open cells at the surface 32*a-b*, these surfaces could and preferably should be regarded as surface planes 32*a-b*.

Figure 6A:
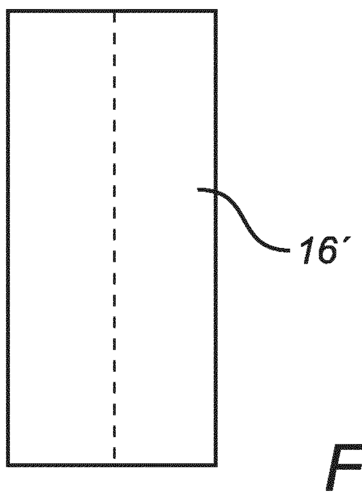
FIGS. 6*a-c* illustrate manufacturing of a non-uniform volumetric diffuser with a mirrored foam structure.
Figure 6B:
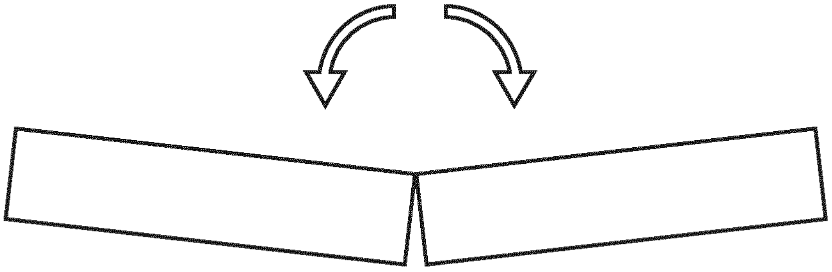
Figure 6C:
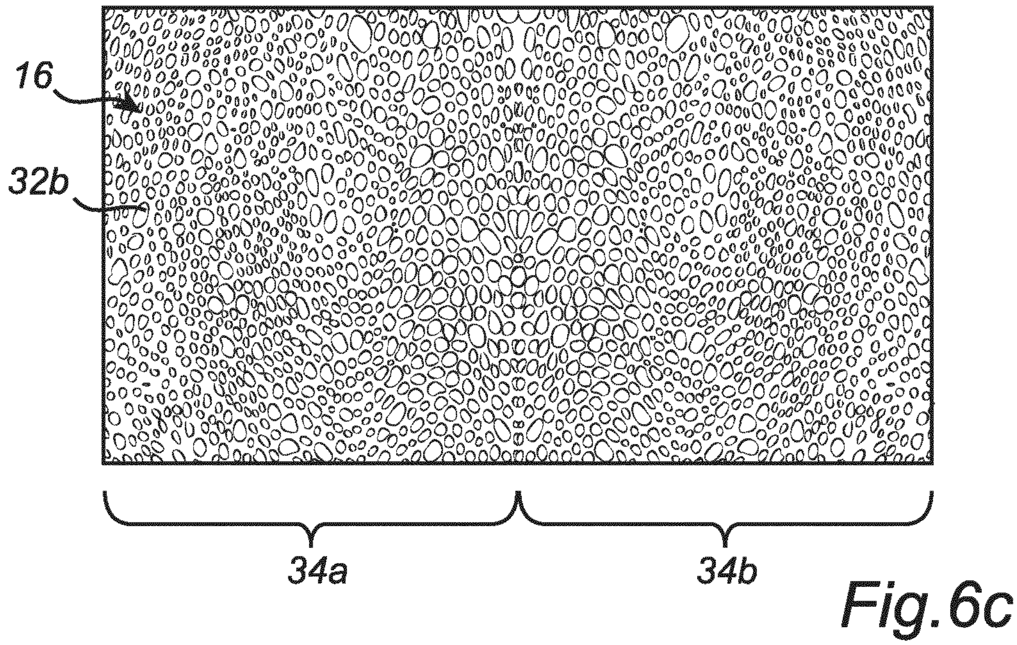

FIGS. 6*a-c* illustrate manufacturing of an alternative non-uniform volumetric diffuser 16 that could be used in the lighting device 10. The non-uniform volumetric diffuser 16 in FIG. 6*c*, which is a top view, comprises two (substantially/seemingly) mirror-symmetric portions 34*a-b* on the second surface 32*b*. These may be formed by cleaving, namely cutting a precursory non-uniform volumetric diffuser 16' (e.g. a block of foam) in half (FIG. 6*a*), and opening it up like a "book" (FIG. 6*b*). Also the first surface 32*a* could have two of such mirror-symmetric portions (not shown).

Figure 7A:
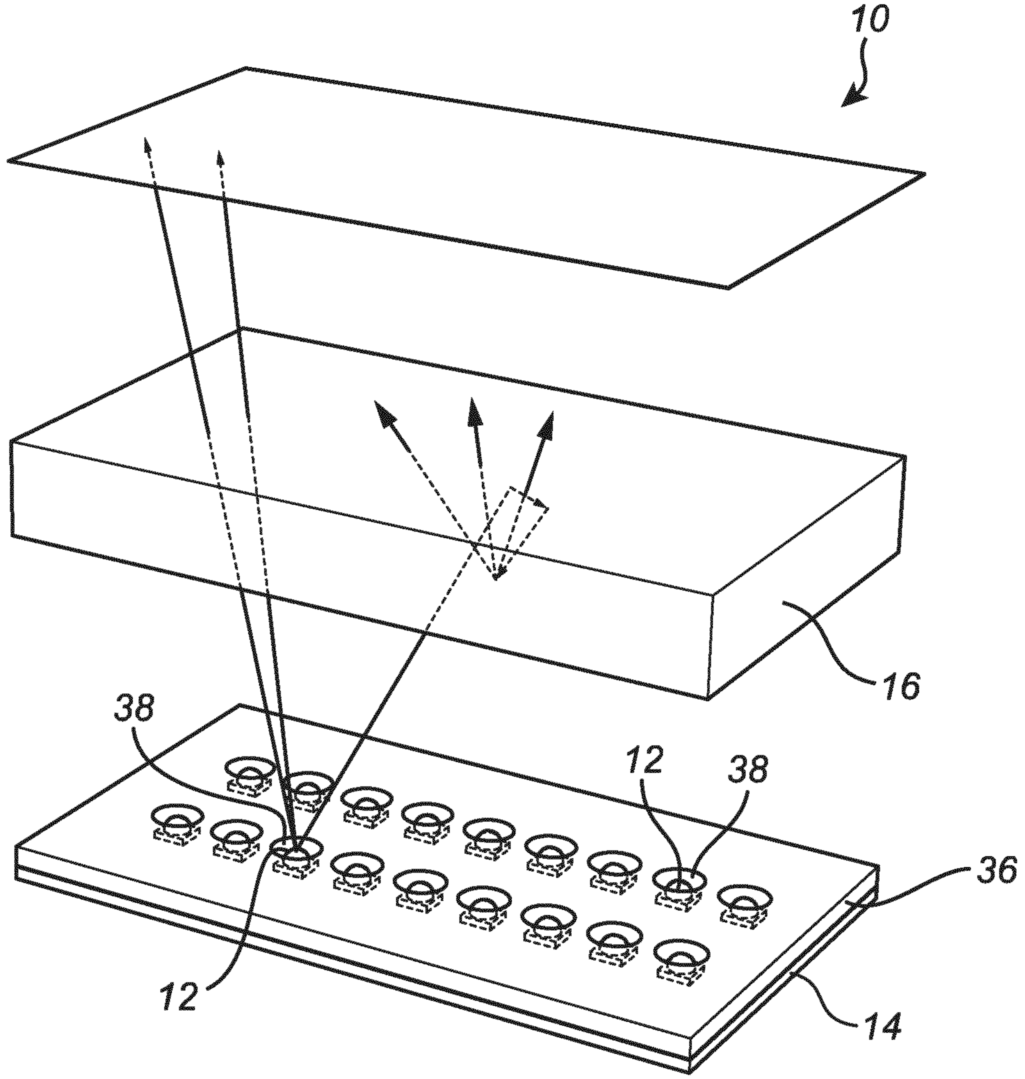
FIGS. 7*a-b* illustrate a lighting device according to an embodiment with a holed reflector sheet.
Figure 7B:
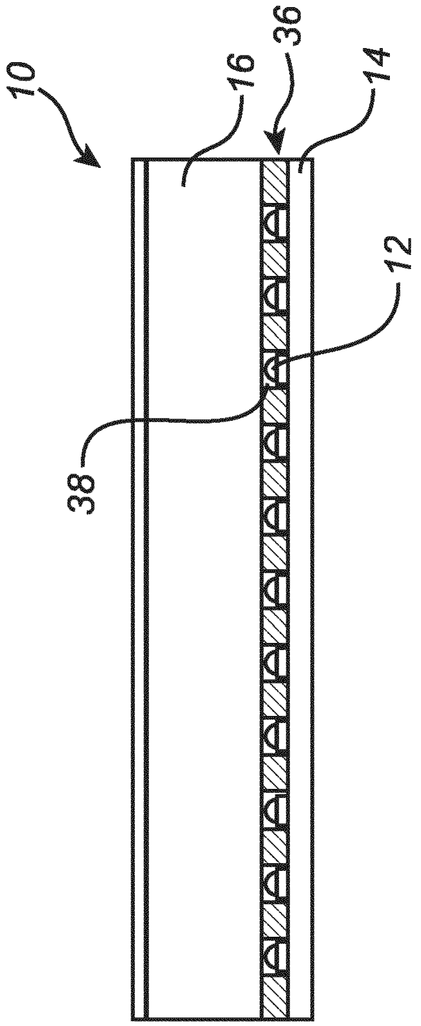

FIGS. 7*a-b* illustrates an embodiment of the lighting device 10 similar to FIGS. 1-2, but further comprising a holed reflector sheet 36. The holed reflector sheet 36 is overlayed to the carrier 14, and serves as a mechanical spacer between the discrete light sources 12 and the non-uniform volumetric diffuser 16. That is, the holed reflector sheet 36 ensures that that there is no mechanical contact between the discrete light sources 12 and the non-uniform volumetric diffuser 16. The holed reflector sheet 36 comprises a plurality of holes 38 matching the plurality of discrete light sources 12. The holed reflector sheet 36 may for example be made of MCPET, white polyethylene or a coating of white paint comprising $TiO_2$ and/or $BaSO_4$, etc.

Figure 8:
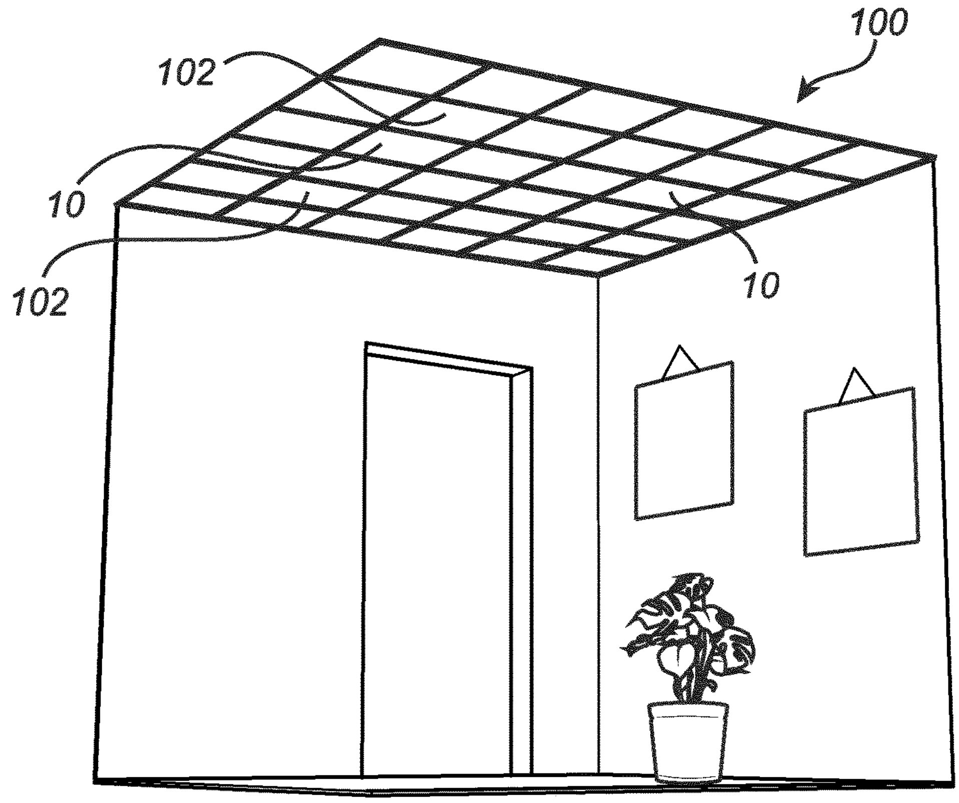
FIG. 8 illustrates the present lighting device as a lighting tile in a ceiling.

The present lighting device 10 may for example be applied in a ceiling, specifically as a lighting tile 10 in an acoustic ceiling 100 mixed with acoustic tiles 102 arranged in a grid, as shown in FIG. 8. The lighting device/tile 10 could for example be square (e.g. 60×60 cm). Several such lighting devices/tiles 10 could be provided in the ceiling 100. When the lighting device 10 is off (as in FIG. 8), it blends in perfectly with the regular acoustic tiles 102.

Figure 9:
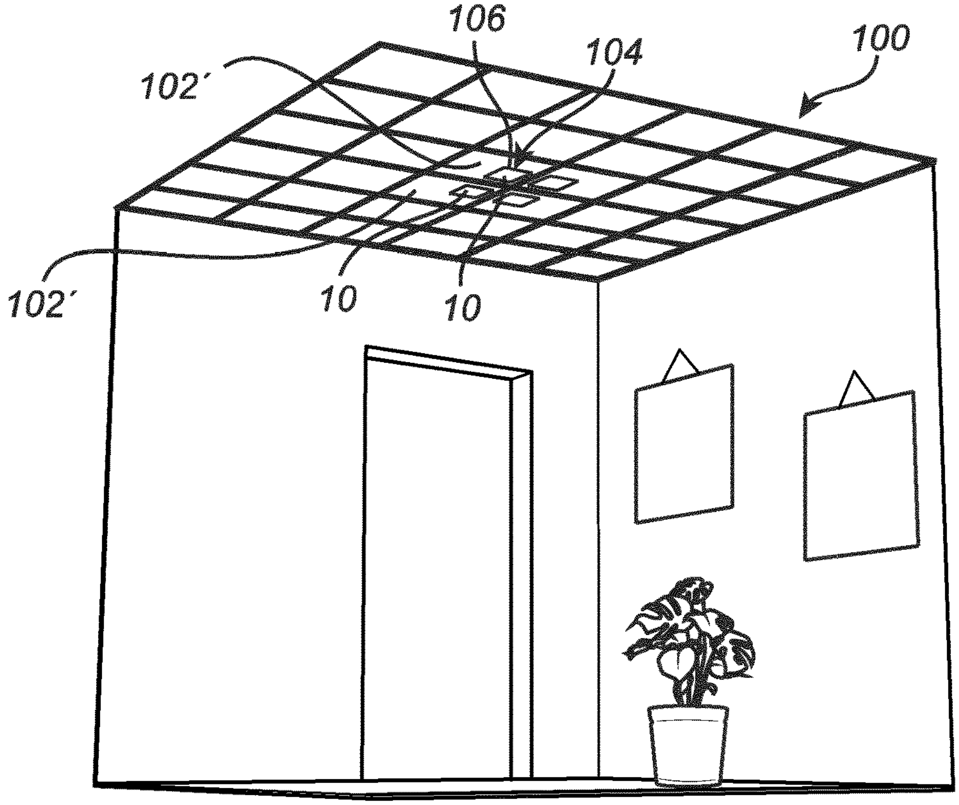
FIG. 9 illustrates the present lighting device integrated in an acoustic tile.

Furthermore, the lighting device 10 could be integrated in an acoustic tile 102', as shown in FIG. 9. The lighting device 10 may be arranged in a (cut) hole 104 in the acoustic tile 102'. The hole 104 could have any shape or size. The hole 104 can for example be square, as in FIG. 9. The peripheral edge of the cut hole 104 may be equipped with a light reflective layer 106, as to hide the transition edge between the lighting device 10 and the remaining acoustic tile. In the off-state, the lighting device 10 acts as an acoustic tile portion, and the ceiling 100 appears fully uniform. On the other hand, in the on-state, the portion of the acoustic tile 102' corresponding to the lighting device 10 lights up (FIG. 9), with the lit portion showing sparkle, texture, and depth beyond the ceiling 100.

Figure 10:
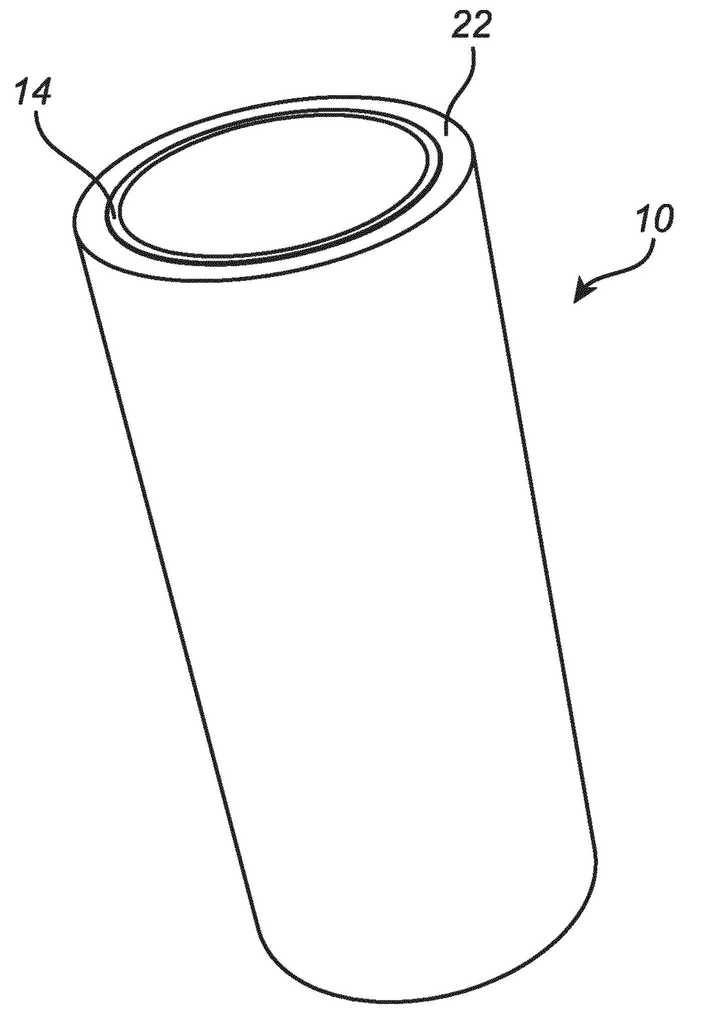
FIG. 10 is a schematic perspective view of a lighting device according to an embodiment with a curved diffuser stack.

FIG. 10 illustrates an embodiment of the lighting device 10 similar to FIGS. 1-2, but wherein the double diffuser stack 22 is curved, here into a (right circular) cylinder shape, instead of being flat or planar as in FIGS. 1-2. Also the carrier 14 with the light sources 12 can be curved into a matching cylinder shape, for example by using a flexible PCB. The lighting device 10 of FIG. 10 could for example be used to build a marbled pendulum lamp, which has uniform appearance in the off-state, but in the on-state changes perspective and shows sparkle dynamically as the viewing angle is changed when a person moves around the lamp.

Not all of the curved lighting device 10 needs to be lit (at the same time). The pattern of the light sources 12 as well as the holed reflector sheet can be adapted to achieve a desired/customized effect, for example a spiral LED pattern. Optionally, the carrier 14 is a partitioned carrier, comprising different segments that can be controlled individually, or the carrier comprises of an active or passive matrix LED array.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lighting device, comprising:

at least one light source adapted to emit light;

a uniform diffuser forming a light exit window of the lighting device; and a non-uniform volumetric diffuser arranged between at least one light source and the uniform diffuser, such that the light exit window is non-uniformly lit when the lighting device is on, wherein the non-uniform volumetric diffuser has a first surface facing at least one light source and a second, opposite surface facing the light exit window, wherein the non-uniform volumetric diffuser has open and/or closed cells, and wherein at least some of the open and/or closed cells have cell diameters in the range of 0.6-1.0 cm and at least some of the open and/or closed cells have cell diameters in the range of 0.01-0.1 cm.

2. A lighting device according to claim 1, wherein the first backside surface of the volumetric diffuser is provided with pockets, dents, and/or an embossed pattern.

3. A lighting device according to claim 1, wherein the non-volumetric diffuser has a thickness t in a perpendicular direction relative to said first surface and to said second surface, and wherein the non-volumetric diffuser comprises cells having a diameter in the range of 25-40% of said thickness t.

4. A lighting device according to claim 1, wherein the non-uniform volumetric diffuser is configured such that some of the emitted light is diffused by the non-uniform volumetric diffuser before striking the light exit window whereas at least one other portion of the emitted light passes through the non-uniform volumetric diffuser without being substantially diffused.

5. A lighting device according to claim 1, wherein the non-uniform volumetric diffuser has 80-95% of cells.

6. A lighting device according to claim 1, wherein the average cell size of open and/or closed cells of the non-uniform volumetric diffuser increases from the first surface to the second surface.

7. A lighting device according to claim 1, wherein the non-uniform volumetric diffuser comprises at least two substantially mirror-symmetric portions on said first surface and/or said second surface formed by cleaving.

8. A lighting device according to claim 1, wherein the uniform diffuser is selected such that a texture of the non-uniform volumetric diffuser is visible beyond the uniform diffuser when the lighting device is on but not visible through the uniform diffuser when the lighting device is off.

9. A lighting device according to claim 1, wherein the uniform diffuser is a uniform plate or sheet diffuser.

10. A lighting device according to claim 1, wherein the uniform diffuser is an amorphous diffuser, preferably having an amorphous surface layer, coat, or film.

11. A lighting device according to claim 1, wherein the uniform diffuser and the non-uniform volumetric diffuser form a diffuser stack arranged to be backlit by the at least one light source.

12. A lighting device according to claim 11, wherein the diffuser stack is curved over multiple dimensions.

13. A lighting device according to claim 1, wherein the at least one light source comprises a plurality of discrete light sources arranged on a carrier.

14. A lighting device according to claim 13, further comprising a holed reflector sheet overlayed to the carrier and serving as a mechanical spacer between the discrete light sources and the non-uniform volumetric diffuser such that there is no mechanical contact between the discrete light sources and the non-uniform volumetric diffuser, the holed reflector sheet comprising a plurality of holes matching the plurality of discrete light sources.

15. A lighting device according to claim 1, integrated in an acoustic tile.

* * * * *